US010444737B2

(12) United States Patent
Saitou et al.

(10) Patent No.: US 10,444,737 B2
(45) Date of Patent: Oct. 15, 2019

(54) NUMERICAL CONTROLLER HAVING PARAMETER SETTING SUPPORT FUNCTION RELATING TO CYCLE TIME

(71) Applicant: FANUC Corporation, Minamitsuru-gun, Yamanashi (JP)

(72) Inventors: Takuya Saitou, Minamitsuru-gun (JP); Koichi Murata, Minamitsuru-gun (JP); Mamoru Kubo, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 288 days.

(21) Appl. No.: 14/930,813

(22) Filed: Nov. 3, 2015

(65) Prior Publication Data

US 2016/0154404 A1 Jun. 2, 2016

(30) Foreign Application Priority Data

Nov. 28, 2014 (JP) .................................. 2014-241738

(51) Int. Cl.
*G05B 19/4155* (2006.01)

(52) U.S. Cl.
CPC .................... *G05B 19/4155* (2013.01); *G05B 2219/31103* (2013.01)

(58) Field of Classification Search
None
See application file for complete search history.

(56) References Cited

U.S. PATENT DOCUMENTS

| 6,401,004 B1 | 6/2002 | Yamazaki et al. | |
|---|---|---|---|
| 2002/0195983 A1* | 12/2002 | Iwashita | G05B 19/408 318/567 |
| 2003/0083772 A1* | 5/2003 | Shiba | G05B 19/409 700/180 |
| 2003/0110006 A1* | 6/2003 | Nakamura | G05B 19/406 702/176 |

(Continued)

FOREIGN PATENT DOCUMENTS

| CN | 102467113 A * | 5/2012 |
|---|---|---|
| DE | 10 2004 016 124 A1 | 10/2004 |
| DE | 10 2010 064 308 A1 | 8/2011 |

(Continued)

OTHER PUBLICATIONS

Henderson "Cycle Time Reduction for Optimization of Injection Molding Machine Parameters for Process Improvement" Proceedings of the 2006 IJME—Intertech Conference.*

(Continued)

*Primary Examiner* — Brian W Wathen
*Assistant Examiner* — Hung H Dang
(74) *Attorney, Agent, or Firm* — Drinker Biddle & Reath LLP

(57) ABSTRACT

A numerical controller operates a machine tool based on a plurality of parameters and a machining program. A user is allowed to refer to a parameter that has not been set, in other words, a parameter not falling within the range of recommended setting values, among parameters that may influence the shortening of a cycle time of the operation of the machining program on a display screen. For this reason, the user can use the parameter as a reference for reviewing the parameter setting for the purpose of shortening the cycle time or the like.

4 Claims, 10 Drawing Sheets

(56) References Cited

U.S. PATENT DOCUMENTS

2004/0204786 A1    10/2004   Nakamura
2011/0190925 A1     8/2011   Fujishima et al.

FOREIGN PATENT DOCUMENTS

| EP | 0 881 034 A1 | 12/1998 |
|----|--------------|---------|
| JP | H05-73125 A | 3/1993 |
| JP | H10-207514 A | 8/1998 |
| JP | H11-231914 A | 8/1999 |
| JP | 2002-073128 A | 3/2002 |
| JP | 2003-136369 A | 5/2003 |
| JP | 2007-025945 A | 2/2007 |
| JP | 2009-295056 A | 12/2009 |
| JP | 2012-027607 A | 2/2012 |

OTHER PUBLICATIONS

Decision to Grant a Patent dated Aug. 23, 2016 in Japanese Patent Application No. 2014-241738 (3 pages) with an English Translation (3 pages).

Office Action dated Nov. 13, 2017 in German Patent Application No. 10 2015 015 291.2 (8 pages) with an English translation (7 pages).

* cited by examiner

FIG. 2

| PARAMETER NUMBER | BIT NUMBER | OVERVIEW | RECOMMENDED SETTING VALUE | SETTING VALUE FOR AUTOMATIC SETTING | GUIDANCE INFORMATION | CHECKING OF TOOL PATH | CHECKING OF LADDER PROGRAM | DIAGRAM OF MODIFIED EXAMPLE OF LADDER PROGRAM |
|---|---|---|---|---|---|---|---|---|
| PARAMETER INFORMATION RELATING TO ENTIRE OPERATION OF MACHINING PROGRAM | | | | | | | | |
| ○○○○ | 1 | SET SPECIFICATION OF _ | 1 | 1 | ITEM A-1 | NOT REQUIRED | NOT REQUIRED | — |
| ·· | ·· | ·· | ·· | ·· | ·· | ·· | ·· | ·· |
| PARAMETER INFORMATION RELATING TO FAST FORWARD FEED OPERATION | | | | | | | | |
| △△△△ | — | SET WIDTH OF _ | 20~50 | 30 | ITEM B-1 | REQUIRED | NOT REQUIRED | — |
| ·· | ·· | ·· | ·· | ·· | ·· | ·· | ·· | ·· |
| PARAMETER INFORMATION RELATING TO CUTTING FEED OPERATION | | | | | | | | |
| □□□□ | — | SET TIME OF _ | 100~150 | 120 | ITEM C-1 | NOT REQUIRED | NOT REQUIRED | — |
| ·· | ·· | ·· | ·· | ·· | ·· | ·· | ·· | ·· |
| PARAMETER INFORMATION RELATING TO AUXILIARY FUNCTION EXECUTION OPERATION | | | | | | | | |
| ××× | 5 | SET FORM OF _ | 1 | 1 | ITEM D-1 | NOT REQUIRED | REQUIRED | DIAGRAM A |
| ·· | ·· | ·· | ·· | ·· | ·· | ·· | ·· | ·· |
| ·· | ·· | ·· | ·· | ·· | ·· | ·· | ·· | ·· |

FIG.6
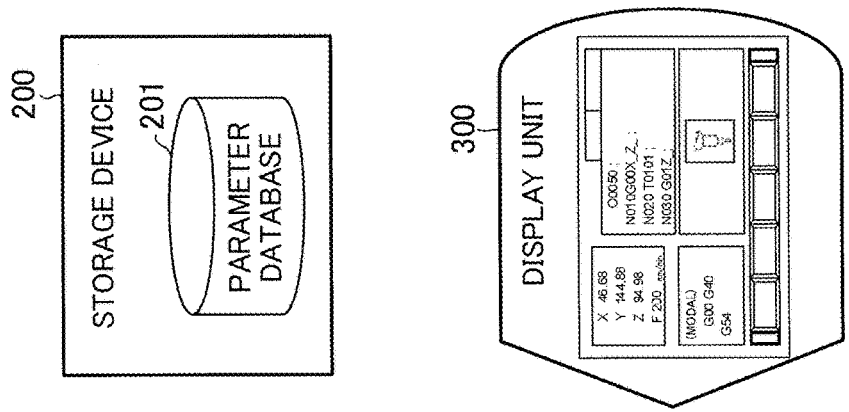
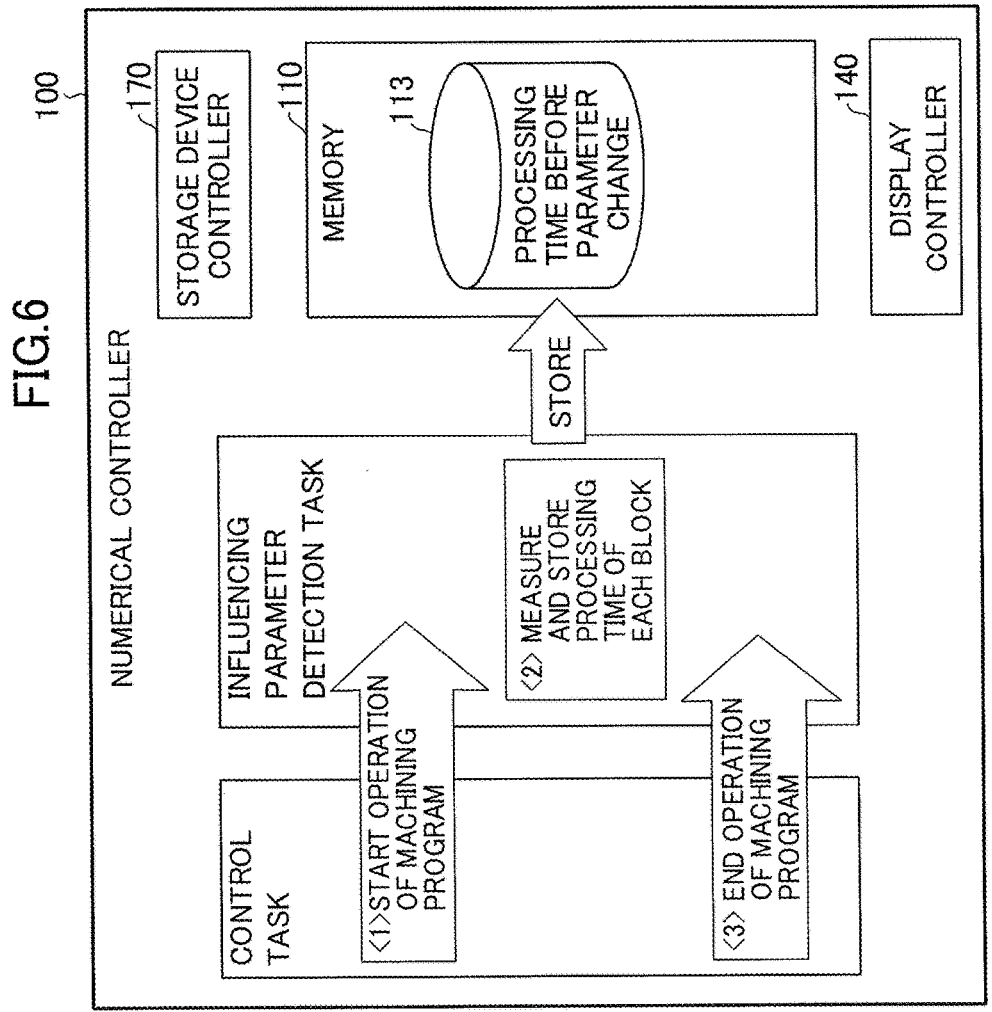

NUMERICAL CONTROLLER HAVING PARAMETER SETTING SUPPORT FUNCTION RELATING TO CYCLE TIME

RELATED APPLICATION DATA

This application claims priority under 35 U.S.C. § 119 and/or § 365 to Japanese Application No. 2014-241738 filed Nov. 28, 2014, the entire contents is incorporated herein by reference.

BACKGROUND OF THE INVENTION

1. Field of the Invention

The present invention relates to a numerical controller, and more particularly, to a numerical controller capable of easily checking and setting information of parameters concerning a cycle time relating to a machining program on an operation screen.

2. Description of the Related Art

Generally, parameters concerning a cycle time are set after appropriate values are reviewed by looking through a reference material such as a manual. In addition, a setting support function for executing such setting in an interactive form is known as disclosed in JP 2009-295056 A, JP 2012-027607 A, and JP 2002-073128 A.

Among parameters concerning a cycle time, there are parameters that change a machine operation such as a tool path by being set. Thus, in order to verify actual employment of a setting of a parameter, it is necessary to specify influenced portions of a machining program and to check the effect for the cycle time and the influence on the machine operation. For this reason, after a parameter relating to the cycle time is set, as a clue used for specifying influenced portions of the machining program, for the entire machining program or portions of an estimated machining program that are considered to be influenced by the setting of the parameter, the cycle times are measured before and after the setting of the parameter, and the measurement results are compared with each other.

In a numerical controller, there are various kinds of parameters concerning a cycle time, and, in order to select a parameter matching the machining program among the parameters by checking a reference document such as a manual, sufficient understanding of each parameter is necessary, which requires a lot of time.

In addition, also in the setting support function of a conventional technology, in a case where the content is not necessarily a content according to user's machining program, and, particularly, in a case where the machining program is configured by a plurality of operation contents, it is necessary to execute setting by checking each operation content within the machining program, whereby a time is necessary.

In addition, there are a parameter having an influence on only a specific function and a parameter having an influence on a plurality of functions, and, in a verification process, particularly, in a case where the scale of the machining program is large, according to the conventional technology, it is not easy to specify each portion of the program of which the processing time is influenced by a set parameter.

SUMMARY OF THE INVENTION

An object of the present invention is to provide a numerical controller capable of easily checking and setting information of parameters concerning a cycle time relating to a machining program on an operation screen.

A numerical controller according to the present invention machines a workpiece by operating a tool machine based on a plurality of parameters and a machining program. The numerical controller comprising: a parameter database that stores information relating to the plurality of parameters by dividing the information into a plurality of groups respectively classified based on operation contents influenced by the parameters and a group of parameters influencing the entire operation; and an unset parameter detection unit that stores an operation content of each block of the machining program at the time of operating the machine tool, searches the parameter database based on the operation content of each block, specifies the parameters relating to the operation content of each block, detects an unset parameter among the parameters relating to the operation content, and detects an unset parameter among parameters influencing the entire operation.

In the numerical controller, the information relating to the plurality of parameters may include information of recommended setting values of the parameters, and the unset parameter detection unit may be configured to detect a parameter that has a setting value currently set in the numerical controller being different from the recommended setting value of each parameter stored in the parameter database, among the parameters relating to the operation contents and the parameters influencing the entire operation, as an unset parameter.

The numerical controller may further include: a processing time measurement unit that measures a processing time of each block of the machining program at the time of operating the machine tool; a changed parameter information storage unit that stores changed parameter information when a parameter is changed; a before-parameter-change processing time storage unit that stores a processing time of each block of the machining program before the parameter change, measured by the processing time measurement unit; a after-parameter-change processing time storage unit that stores a processing time of each block of the machining program after the parameter change, measured by the processing time measurement unit; and an influencing parameter detection unit that specifies, based on the processing time stored in the before-parameter-change processing time storage unit and the processing time stored in the after-parameter-change processing time storage unit, a block of the machining program having the processing time changed before and after the parameter change, and specifies, by referring to the parameter database, the changed parameter information stored in the changed parameter information storage unit relating to the operation content of the specified block, and specifies parameter information stored in the changed parameter information storage unit belonging to the group of parameters influencing the entire operation.

According to the present invention, the information of parameters relating to the cycle time relating to the user's machining program can be easily checked and set on the operation screen of the numerical controller. In addition, the block information influenced by the setting of the parameters and parameter information relating thereto can be specified without taking much labor. Furthermore, also in a case where there is an erroneous setting or a setting omission of the parameters, by referring to the unset parameter information, such a setting can be easily corrected.

BRIEF DESCRIPTION OF THE DRAWINGS

The forgoing and other objects and feature of the invention will be apparent from the following description of preferred embodiments of the invention with reference to the accompanying drawings, in which:

FIG. 2 is a diagram that illustrates an example of a parameter database stored in s storage device illustrated in FIG. 1;

FIG. 6 is a diagram that illustrates the sequence (1) of a process of detecting influencing parameters that is executed by the numerical controller illustrated in FIG. 1;

DETAILED DESCRIPTION OF THE PREFERRED EMBODIMENTS

Figure 1:
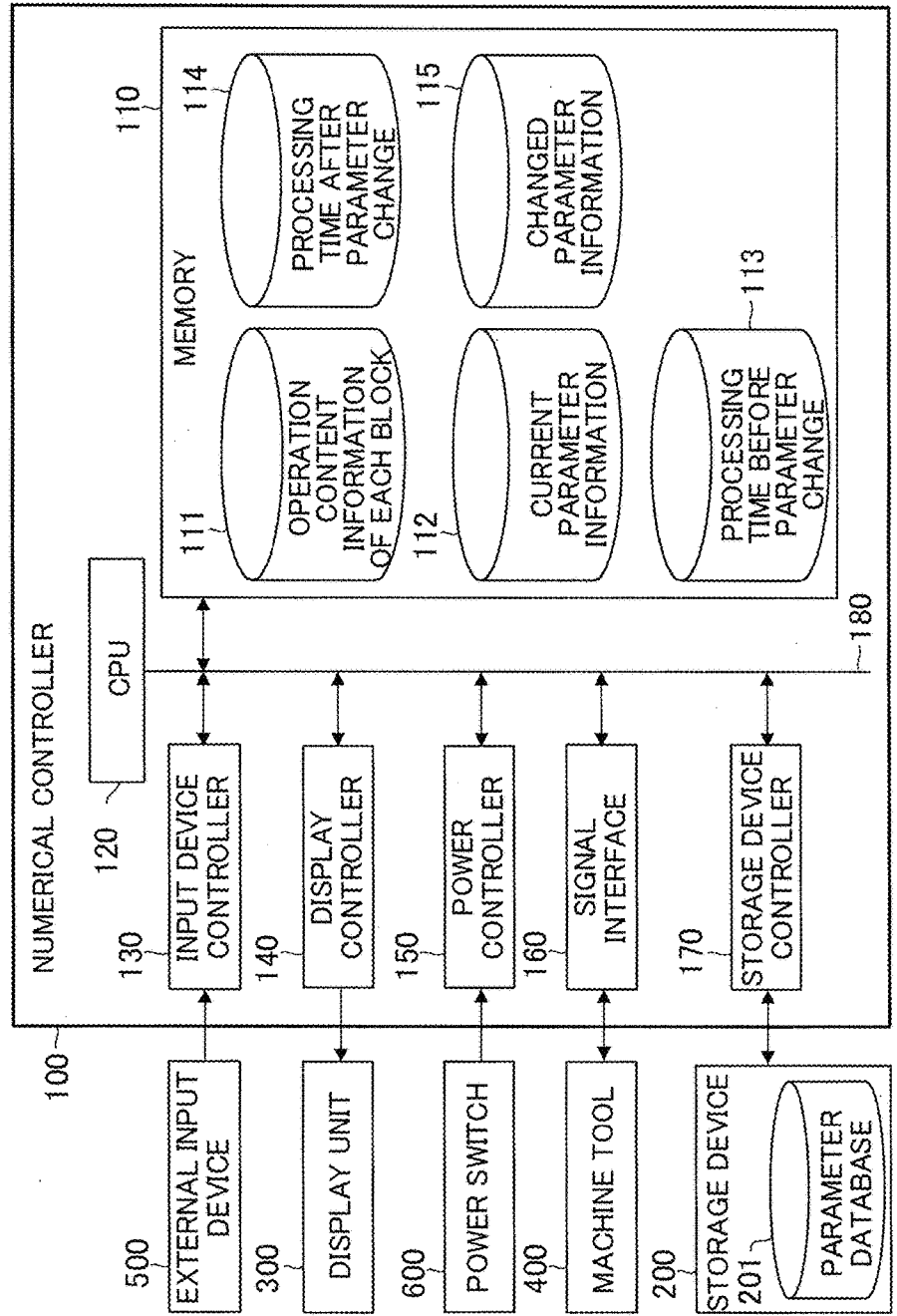
FIG. 1 is a block diagram that illustrates a numerical controller according to an embodiment of the present invention.

First, an overview of a parameter setting function according to the present invention will be described.

According to the present invention, a database is prepared in which parameters concerning a cycle time are registered for the whole operation of a machining program, or the parameters are registered for each group divided for each operation content of the machining program such as a fast-forward feed operation, a cutting feed operation, or a threading operation. Then, a function for displaying information supporting the setting of parameters by using the database and a function for setting recommended values and the like of the parameters are provided in the numerical controller.

In this database, information of an overview and a recommended setting value of each parameter, setting value information for automatic setting of the parameter, information representing whether or not checking of a tool path or a ladder program is necessary at the time of setting the parameter, and the like are stored.

In the numerical controller, when a machining program is operated, by referring to the current setting of the parameter and the database described above, in a case where there is an unset parameter of which setting is recommended, an overview and a recommended setting value of the parameter are displayed. Here, the operation of the machining program may be either a field operation or a simulation operation. In addition, according to the present invention, among the parameters of the numerical controller, a parameter of which the setting value that is currently set does not fall within the range of recommended setting values of the parameter stored in the database is referred to as "unset parameter".

Such an unset parameter is calculated based on the information of processing precision desired by the user and is set to a setting value for automatic setting that is stored in the database or is set by the user according to the guidance displayed on the display unit. In addition, there are cases where the tool path is changed depending on the parameter setting, and, as a result, when the tool path needs to be checked, a warning statement is displayed. In addition, there are cases where the ladder program needs to be changed depending on the parameter setting, and, as a result, when the ladder program needs to be checked, a warning statement and a modified example are displayed.

In addition, in the numerical controller, the processing times of each block of the machining program before and after the parameter setting are automatically measured, and each block portion of which the processing time is changed is extracted and displayed.

The operation content of the block of which the processing time is changed and the changed parameter information are checked, and, in a case where information coinciding therewith is present in the database, the information is displayed. In addition, also in a case where there is parameter information relating to the entire operation of the machining program in the changed parameter information, when there is information coinciding therewith in the database, the information is displayed.

A numerical controller according to one embodiment of the present invention will be described with reference to a block diagram illustrated in FIG. 1.

The numerical controller 100 includes: a memory 110 such as a RAM; a CPU 120 that is a processor executing arithmetic processing; an input device controller 130 that controls an external input device 500; a display controller 140 that controls a display unit 300; a power controller 150 that controls power on/off of the numerical controller 100 based on an on/off signal transmitted from a power switch 600; a signal interface 160 that relays and controls input/output of signals from/to a machine tool 400; and a storage device controller 170 that controls reading/writing data from/to a storage device 200. Such elements 110, 130, 140, 150, 160, and 170 are connected to the CPU 120 through a bus 180.

The memory 110 is a storage unit storing data that is necessary for the operation of the numerical controller 100 or various kinds of data input from the outside by the storage device 200, the external input device 500, and the like or stores a system program and the like. In the memory 110, as storage areas for storing each information necessary for realizing the function of the present invention, an operation content information storage unit 111 storing operation content information of each block, a parameter information storage unit 112 storing current parameter information, a storage unit 113 of processing time before parameter change (before-parameter-change processing time storage unit 113) storing the processing time of each block before the change of parameters, a storage unit 114 of processing time after parameter change (after-parameter-change processing time storage unit 114) storing the processing time of each block after the change of parameters, and changed parameter information 115 storing changed parameters are arranged.

The CPU 120 executes various tasks based on the system program stored in the memory 110 through the bus 180 and controls the overall operation of the numerical controller 100. The tasks include a control task that controls the numerical controller 100, an influencing parameter detection task that detects parameter information influencing the processing time, an unset parameter detection task that detects a parameter which has not been set and is recommended to be set, and the like.

In the storage device 200, a machining program that is a target for a field operation and a machining simulation and various kinds of data necessary for the operation of the numerical controller 100 are stored. In this storage device 200, in order to realize a parameter setting support function relating to the cycle time according to the present invention, a parameter database 201 is stored in which information of parameters relating to the cycle time is registered for the whole operation of the machining program, or the information is registered for each group divided for each operation content of the machining program such as a fast-forward feed operation, a cutting feed operation, or a threading operation is stored.

An example of the parameter database 201 stored in the storage device 200 illustrated in FIG. 1 is illustrated in FIG. 2.

As illustrated in FIG. 2, in the parameter database 201, in association with a parameter number that is associated with each parameter, useful information for user's determination of the setting value of the parameter including an overview of the parameter, recommended setting value information, setting value information for automatic setting of the parameter, information relating to guidance used at the time of setting the parameter, information representing whether checking of a tool path or a ladder program is necessary or not according to the parameter setting, and the like is stored with being grouped into information relating to the entire operation and information relating to respect operation contents. Regarding the operation contents described above, although groups of the fast-forward feed operation, the cutting feed operation, and an auxiliary function execution operation are illustrated as an example in FIG. 2, any other operation content may be introduced according to the type of the machine tool or the like.

The operations of the unset parameter detection task and the influencing parameter detection task executed in the numerical controller having such a configuration will be described below.

<Operation of Unset Parameter Detection Task>

The sequence of the detection of an unset parameter will be described with reference to FIGS. 3 and 4.

Figure 3:
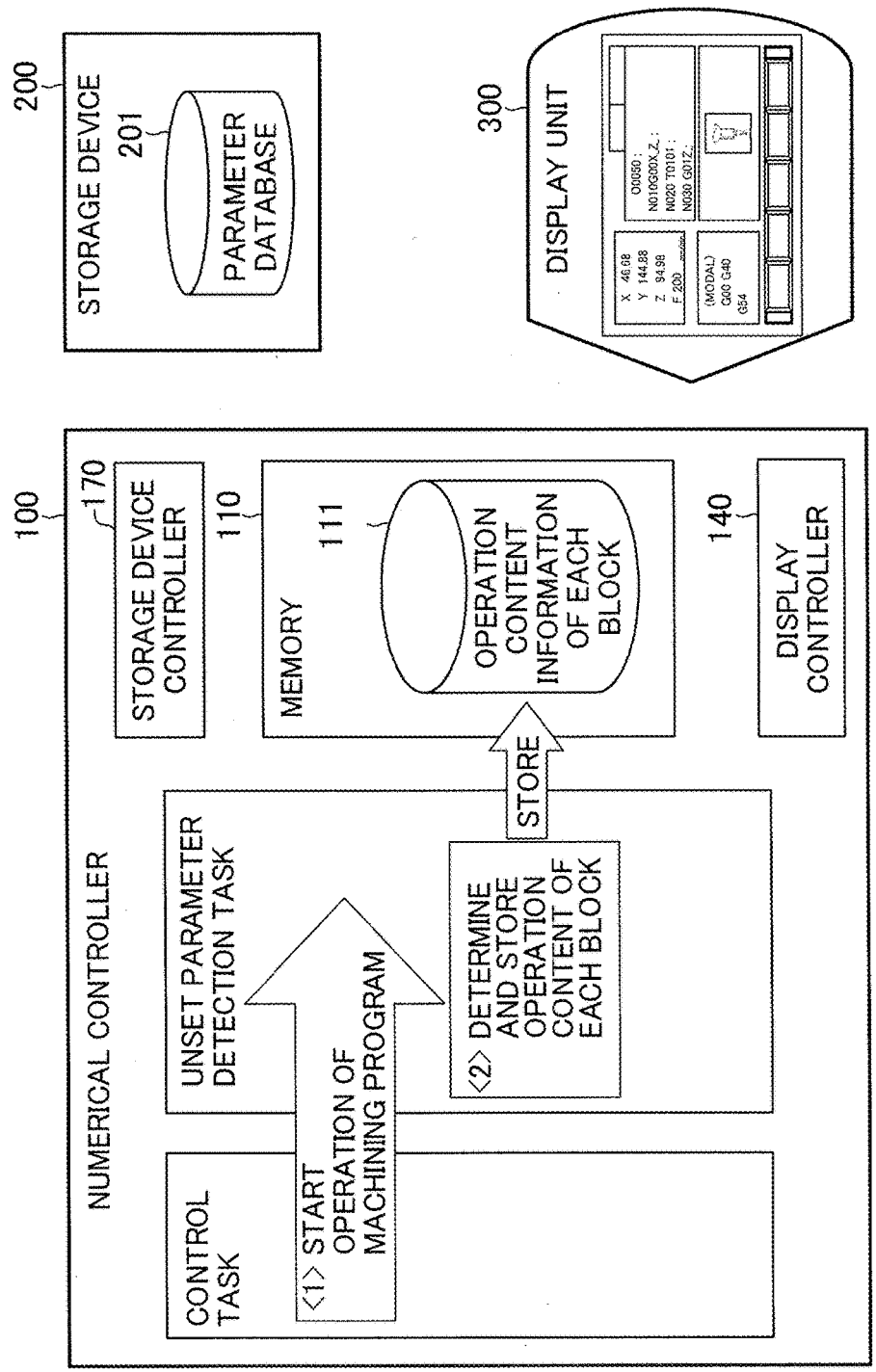
FIG. 3 is a diagram that illustrates the sequence (1) of a process of detecting parameters that have not been set yet by using the numerical controller illustrated in FIG. 1.

As illustrated in FIG. 3, when a machining program is operated according to a control task on the numerical controller 100, the unset parameter detection task generates, for each block, operation content information determined based on information of an instruction mode such as a G code instruction within the block, a modal, and contouring control, and stores the generated operation content information in the operation content information storage unit 111 disposed within the memory 110. The operation of the machining program can be executed in both a field operation and a simulation operation.

Figure 4:
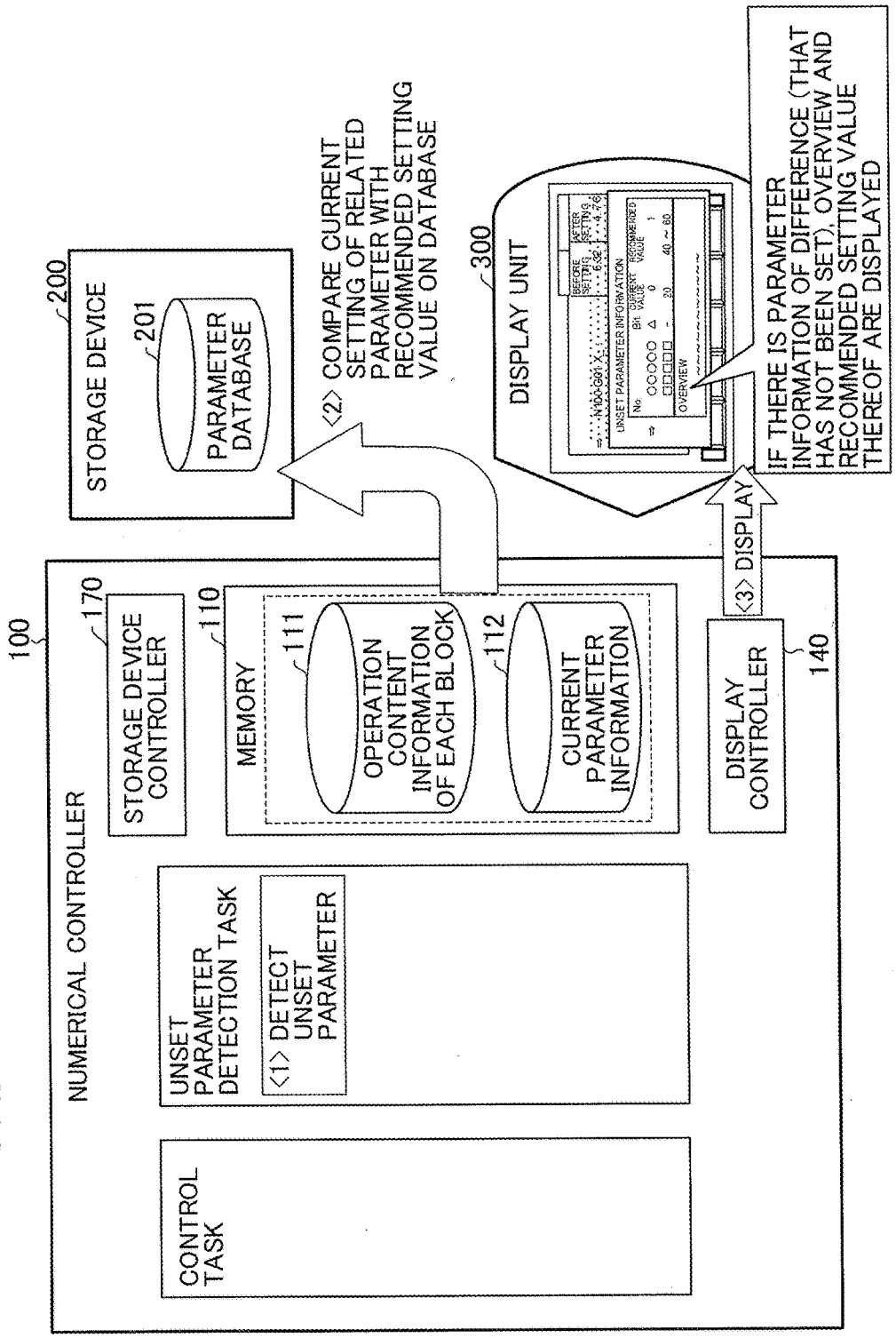
FIG. 4 is a diagram that illustrates the sequence (2) of a process of detecting parameters that have not been set yet by using the numerical controller illustrated in FIG. 1.

After the storage of the operation content information in the operation content information storage unit 111 ends, the unset parameter detection task reads, as illustrated in FIG. 4, the operation content information stored in the operation content information storage unit 111 and extracts the parameter information relating to the entire operation and the parameter information grouped into operation contents each relating to the read operation content information, from the parameter database 201 arranged inside the storage device 200.

Thereafter, the information of the setting value recommended in the parameter information extracted from the parameter database 201 is compared with the current parameter information stored in the parameter information storage unit 112 of the memory 110, a parameter not falling within the range of the setting value recommended in the setting value that is currently set is extracted as unset parameter information, and the overview of the parameter of the extracted unset parameter information and the information of the recommended setting value are displayed on the display screen of the display unit 300.

Then, the user can study how to set a specific parameter by referring to the overview of parameters in the unset parameter information and the information of the recommended setting value displayed on the display unit 300. It may be configured such that, for the unset parameter information, an appropriate value is calculated based on desired machining precision information input by the user, and the current parameter information stored in the parameter information storage unit 112 of the memory 110 is automatically rewritten based on the setting value information for automatic setting of the parameter defined inside the parameter database 201 stored in the storage device 200. Alternatively, it may be configured such that guidance for parameter setting is displayed on the display unit 300 by referring to the information relating to the guidance stored inside the parameter database 201, and the user is allowed to execute the setting. A technology for calculating an appropriate value of a parameter based on the machining precision information is known, for example, as disclosed in JP 2011-158982 A and the like, and thus, detailed description will not be presented here.

In addition, in a case where the unset parameter information represents a parameter having a possibility of changing the tool path by setting the parameter, in other words, a parameter for which the tool path needs to be checked in the parameter database 201, a warning statement indicating such a situation is displayed on the display unit 300.

Furthermore, in a case where the unset parameter information represents a parameter having a possibility of necessarily changing the ladder program by setting the parameter, in other words, a parameter for which checking of the ladder program is to be carried out in the parameter database 201, a diagram of a modified example of the ladder program is displayed on the screen of the display unit 300 together with a warning statement indicating such a situation.

Figure 5:
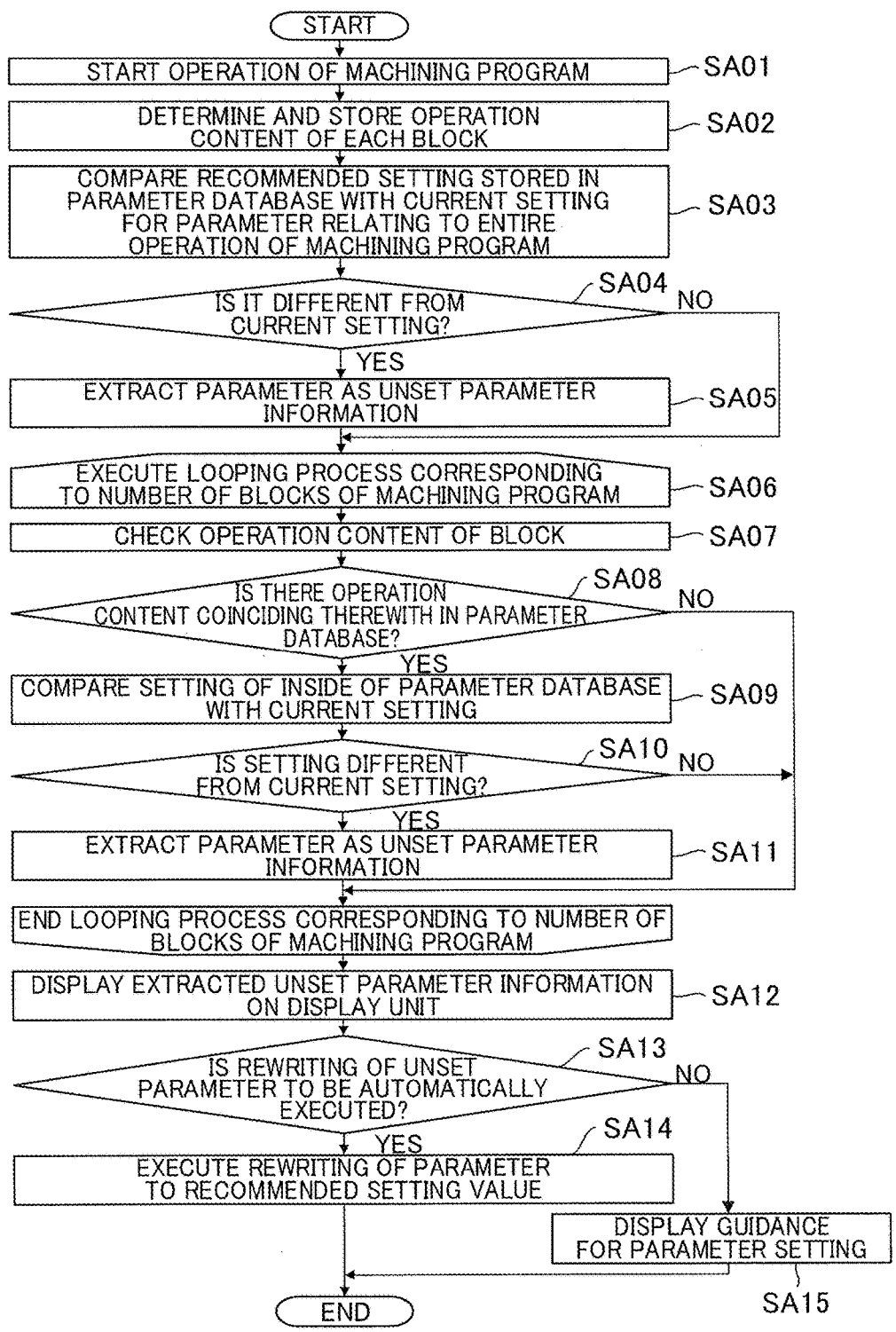
FIG. 5 is a flowchart that illustrates the sequence of a process of detecting an unset parameter executed on the numerical controller illustrated in FIG. 1.

FIG. 5 is a flowchart that illustrates the sequence of a process of detecting an unset parameter (the operation of the unset parameter detection task) executed on the numerical controller 100.

[Step SA01] A control task of the numerical controller 100 executes the operation of a machining program.

[Step SA02] The operation content of each block is determined during the machining operation, and the determined operation content is stored in the operation content information storage unit 111.

[Step SA03] For each of parameters relating to the entire operation inside the parameter database 201, a recommended setting value stored inside the parameter database 201 is compared with the current setting value stored in the parameter information storage unit 112.

[Step SA04] Based on the comparison of Step SA03, it is checked whether or not a parameter of which the current setting value is different from a recommended setting value is present. In a case where such a parameter is present, the process proceeds to Step SA05. On the other hand, in a case where such a parameter is not present (in a case where the current setting value coincides with the recommended setting value) the process proceeds to Step SA06.

[Step SA05] The parameter of which the current setting value is determined to be different from the recommended setting value in Step SA04 is extracted as the unset parameter information.

[Step SA06] For each block of the machining program, the process of Steps SA07 to SA11 is repeated.

[Step SA07] A group to which the operation content of the block belongs is specified.

[Step SA08] It is checked whether an operation content coinciding with the operation content of the block which belongs to the specified group is present or not in the parameter database 201. In a case where the operation content is present, the process proceeds to Step SA09. On the other hand, in a case where the operation content is not present, the looping proceeds to the next block.

[Step SA09] For each parameter belonging to the group of the operation content that is specified in Step SA07 inside the parameter database 201, a recommended setting value stored in the parameter database 201 is compared with the current setting value stored in the parameter information storage unit 112.

[Step SA10] It is checked whether or not a parameter of which the current setting value is different from the recommended setting value is present as a result of the comparison made in Step SA09. In a case where such a parameter is present, the process proceeds to Step SA11. On the other hand, in a case where such a parameter is not present (in a case where the current setting value coincides with the recommended setting value), the looping proceeds to the next block.

[Step SA11] The parameter of which the current setting value is determined to be different from the recommended setting value in Step SA10 is extracted as the unset parameter information.

[Step SA12] The unset parameter information extracted in Steps SA05 and SA11 is displayed on the display screen of the display unit 300.

[Step SA13] It is determined whether rewriting of the parameter that has not been set is to be automatically executed or not, for example, by presenting a user interface allowing the user to make a selection or the like. In a case where the rewriting is to be automatically executed, the process proceeds to Step SA14. Otherwise, the process proceeds to Step SA15.

[Step SA14] A parameter setting value within the range of recommended setting values is calculated based on the machining precision information input by the user and the like, and the calculated parameter setting value is set in the parameter information storage unit 112.

[Step SA15] Based on the information relating to the guidance inside the parameter database 201, guidance for the parameter setting is displayed on the display screen of the display unit 300, whereby the user is allowed to set the parameter.

According to the operation of the unset parameter detection task in the numerical controller 100 described above, the user can refer to a parameter that has not been set, in other words, a parameter of which the setting value does not fall within the range of recommended setting values, among parameters that may influence the shortening of the cycle time of operation of machining program. Accordingly, such a parameter can be used as a reference for reviewing the parameter setting for the purpose of shortening the cycle time and the like.

<Operation of Influencing Parameter Detection Task>

The sequence of the detection of influencing parameters that is executed by the numerical controller 100 will be described with reference to FIGS. 6 to 9.

The influencing parameter detection task of the numerical controller 100, as illustrated in FIG. 6, measures the processing time for each block of the machining program at the time of operating the machining program according to a control task on the numerical controller 100 and stores a result of the measurement in the before-parameter-change processing time storage unit 113 inside the memory 110. The operation of the machining program may be either a field operation or a simulation operation.

Figure 7:
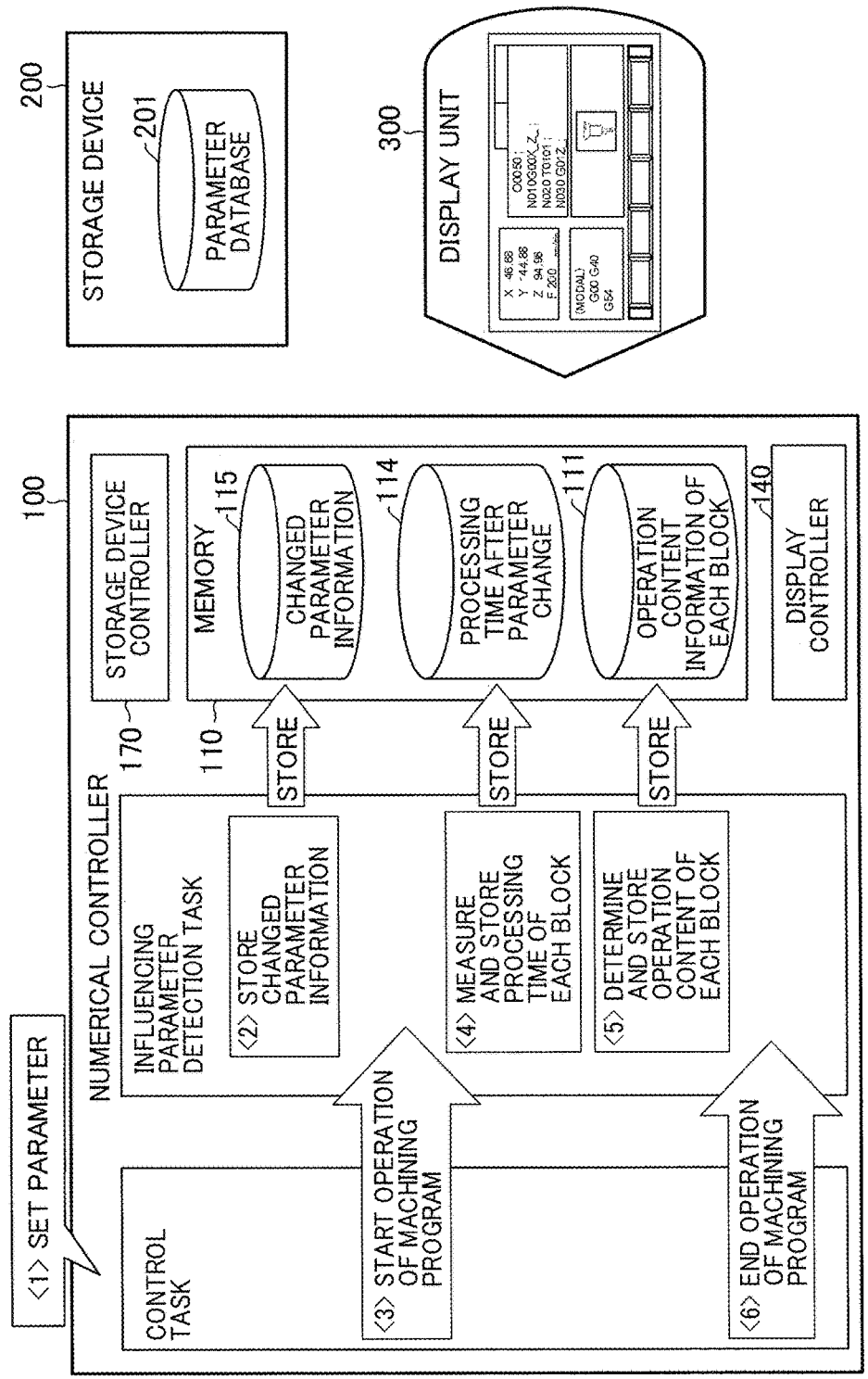
FIG. 7 is a diagram that illustrates the sequence (2) of a process of detecting influencing parameters that is executed by the numerical controller illustrated in FIG. 1.

Next, when the detection and the setting of parameters that have not been set described above or the setting of parameters relating to the cycle time according to a conventional technology is executed, as illustrated in FIG. 7, information of changed parameters is stored in the changed parameter information 115 inside the memory 110. Then, when the operation of the machining program according to the control task is executed again on the numerical controller 100, the influencing parameter detection task measures the processing time for each block of the machining program, stores a result of the measurement in the after-parameter-change processing time storage unit 114 inside the memory 110, and stores the operation content information determined based on the information of the instruction mode such as a G code instruction within each block, a modal, contouring control, and the like in the operation content information storage unit 111 inside the memory 110.

Figure 8:
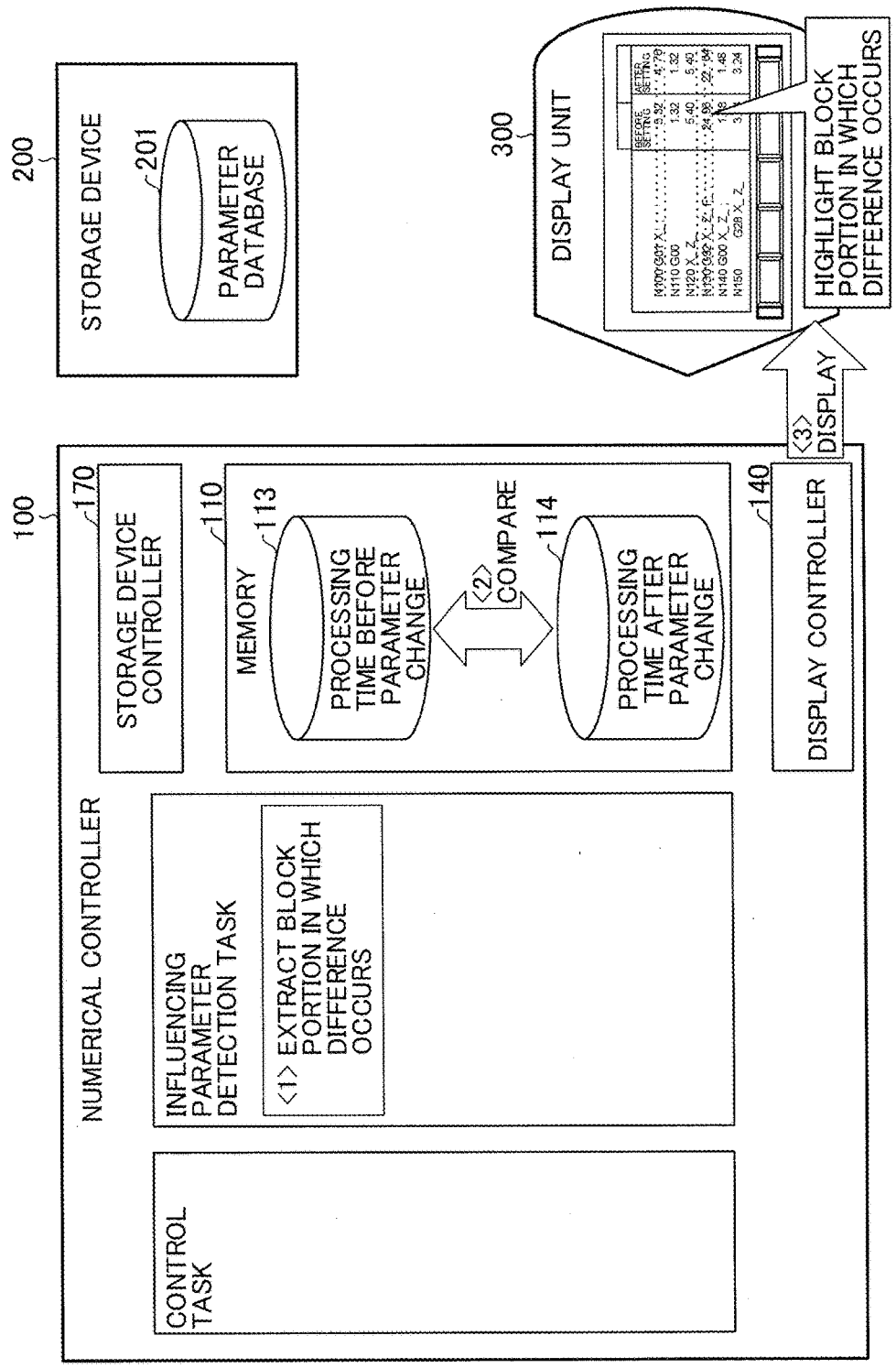
FIG. 8 is a diagram that illustrates the sequence (3) of a process of detecting influencing parameters that is executed by the numerical controller illustrated in FIG. 1.

After the operation of the machining program ends, the influencing parameter detection task, as illustrated in FIG. 8, compares the processing time of each block before the parameter change, which is stored in the before-parameter-change processing time storage unit 113 inside the memory 110, with the processing time of each block after the parameter setting that is stored in the after-parameter-change processing time storage unit 114, extracts a block having a difference between both the processing times, and displays the block on the display screen of the display unit 300.

Figure 9:
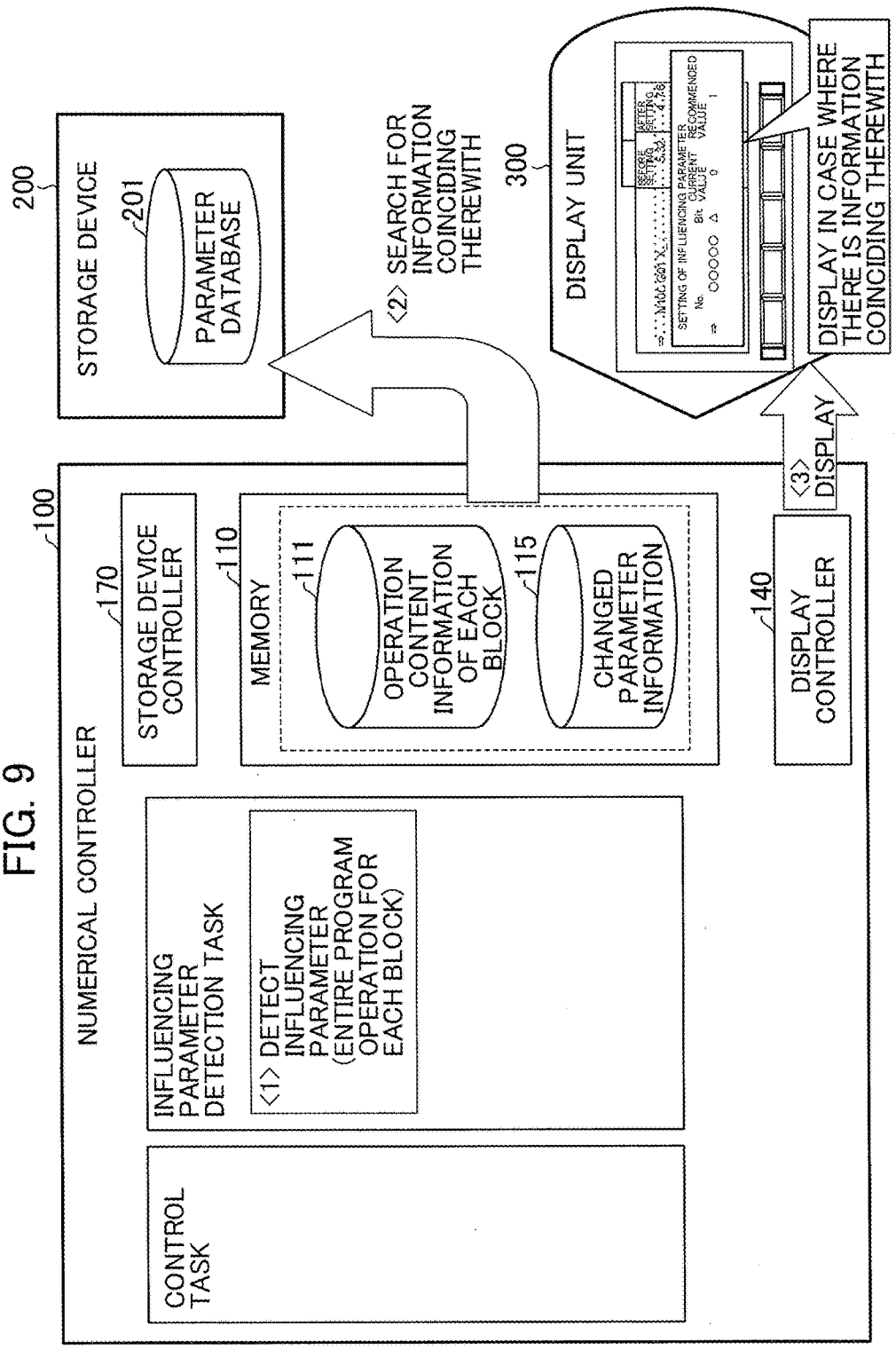
FIG. 9 is a diagram that illustrates the sequence (4) of a process of detecting influencing parameters that is executed by the numerical controller illustrated in FIG. 1.

Thereafter, for the block having a difference between both the processing times, as illustrated in FIG. 9, the "operation content information" stored in the operation content information storage unit 111 inside the memory 110 and the "changed parameter information" stored in the changed parameter information 115 are respectively read, and from the parameter database 201 stored inside the storage device 200, a parameter is searched which is grouped into the operation content relating to the "operation content information" described above and is included in the "changed parameter information" described above. In addition, it is checked whether or not data coinciding with the parameter information relating to the entire operation of the machining program inside the parameter database 201 stored in the storage device 200 is present inside the "changed parameter information" stored in the changed parameter information 115. As a result of the checking, in a case where data coinciding therewith is present, the changed parameter information is displayed on the display screen of the display unit 300.

Figure 10:
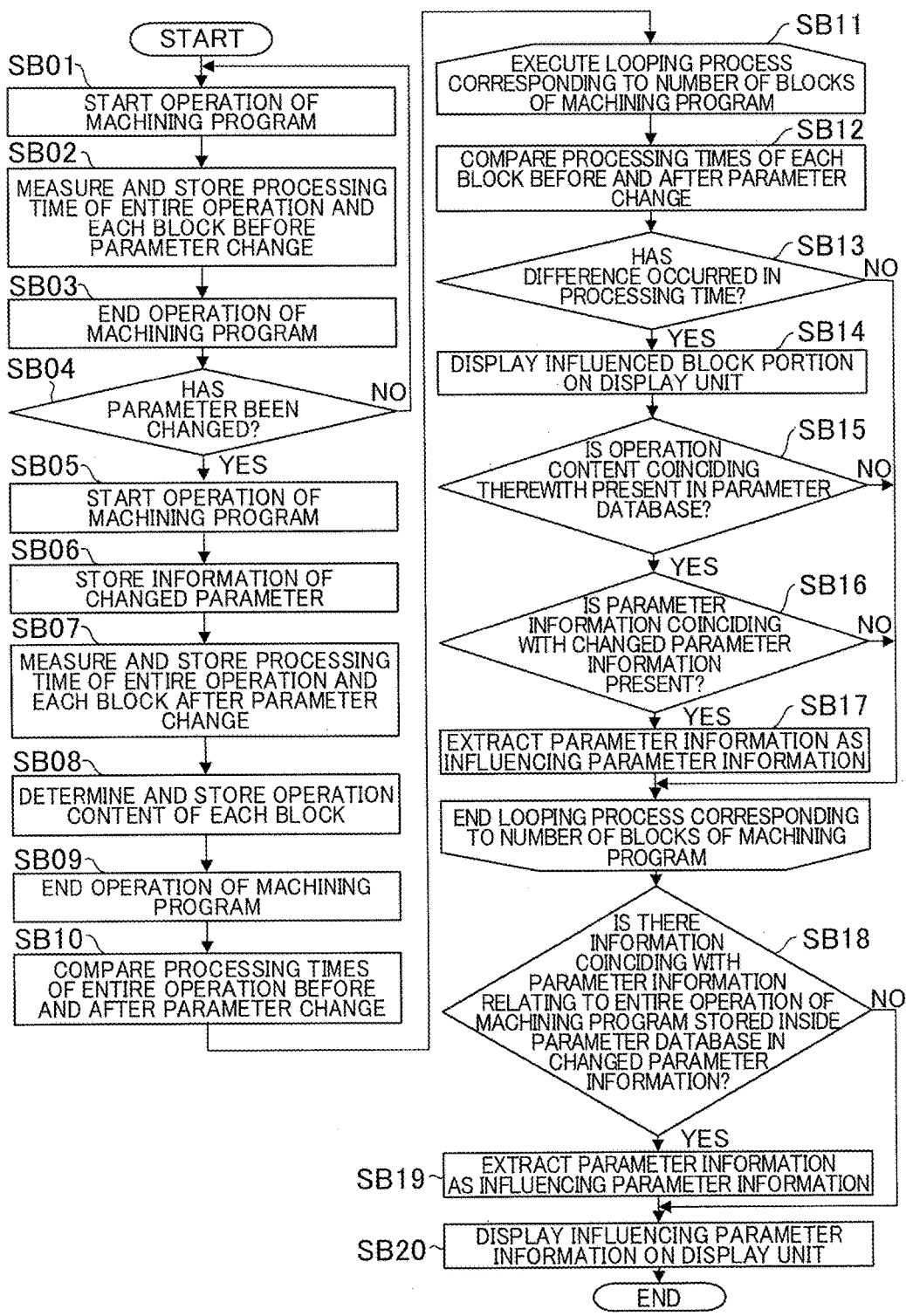
FIG. 10 is a flowchart that illustrates the sequence of a process of detecting influencing parameters that is executed by the numerical controller illustrated in FIG. 1.

FIG. 10 is a flowchart that illustrates the sequence of a process executed on the numerical controller 100 in the detection of influencing parameters.

[Step SB01] The control task of the numerical controller 100 executes the operation of the machining program.

[Step SB02] The processing time of the entire operation and the processing time of each block are measured during the machining operation, and a result of the measurement is stored in the before-parameter-change processing time storage unit 113.

[Step SB03] The operation of the machining program according to the control task ends.

[Step SB04] After the operation of the machining program ends, it is checked whether or not a parameter is changed according to a user's operation or the like. In a case where the parameter is changed, and an instruction for the next machining operation arrives, the process proceeds to Step SB05. On the other hand, in a case where an instruction for the next machining operation arrives without changing the parameter, the process returns to Step SB01.

[Step SB05] The control task executes the operation of the machining program after the parameter change.

[Step SB06] The changed parameter information detected in Step SB04 is stored as the changed parameter information 115.

[Step SB07] During the machining operation after the parameter change, the processing time of the entire operation and the processing time of each block are measured and are stored in the after-parameter-change processing time storage unit 114.

[Step SB08] During the execution of the machining operation, the operation content of each block is determined, and the determined operation contents are stored in the operation content information storage unit 111.

[Step SB09] The operation of the machining program according to the control task ends.

[Step SB10] The processing times of the entire operation before and after the parameter change are compared with each other based on the information stored in the before-parameter-change processing time storage unit 113 and the information stored in the after-parameter-change processing time storage unit 114.

[Step SB11] For each block of the machining program, the process of Steps SB12 to SB17 is repeated.

[Step SB12] The processing times of the block before and after the parameter change are compared with each other based on the information stored in the before-parameter-change processing time storage unit 113 and the information stored in the after-parameter-change processing time storage unit 114.

[Step SB13] It is determined whether or not, as a result of the comparison made in Step SB12, there is a difference between the processing times before and after the parameter change in the operation of the current block. In a case where there is a difference, the process proceeds to Step SB14. On the other hand, in a case where there is no difference, the looping proceeds to the next block.

[Step SB14] A block for which there is a difference between the processing times before and after the parameter change is displayed on the display screen of the display unit 300.

[Step SB15] It is checked whether a group of the operation content of the current block is present or not by referring to the parameter database 201. In a case where such a group is present, the process proceeds to Step SB16. On the other hand, in a case where such a group is not present, the looping proceeds to the next block.

[Step SB16] By referring to the parameter database 201, it is checked whether or not a parameter grouped into the group of the operation content of the current block is present in the "changed parameter" stored in the changed parameter information 115. In a case where such a parameter is present, the process proceeds to Step SB17. On the other hand, in a case where such a parameter is not present, the looping proceeds to the next block.

[Step SB17] The changed parameter information of which the presence is checked in Step SB16 is extracted as influencing parameter information.

[Step SB18] By referring to the parameter database 201, it is checked whether information coinciding with the parameter information relating to the entire operation is present or not in the "changed parameter" stored in the changed parameter information 115. In a case where such information is present, the process proceeds to Step SB19. On the other hand, in a case where such information is not present, the process proceeds to Step SB20.

[Step SB19] The changed parameter information of which the presence is checked in Step SB18 is extracted as parameter information influencing the entire operation.

[Step SB20] The influencing parameter information extracted in Steps SB17 and SB19 is displayed on the display screen of the display unit 300.

Through the operation of the influencing parameter detection task described above, the user can check blocks of the machining program of which the processing time is changed between before and after the parameter change and read information of parameters estimated to influence the change of the processing time, and accordingly, such information can be used as a reference for reviewing the parameter setting for the purpose of shortening the cycle time and the like.

As above, while the embodiment of the present invention has been described, the present invention is not limited to the embodiment described above as an example but can be executed in any other embodiment by applying an appropriate change thereto. For example, processes such as the measurement of the processing time that has high independency among processes executed by the unset parameter detection task and the influencing parameter detection task may be configured to be executed by any other task.

The invention claimed is:

1. A numerical controller which controls operation of a machine tool by analyzing and executing a machining program to machine a workpiece based on a plurality of parameters, the numerical controller comprising:

a parameter database configured to store information relating to the plurality of parameters, wherein the stored information is divided into (i) a plurality of groups of parameter information respectively classified based on operation contents of the machining program influenced by the parameters in the respective group and (ii) parameter information for a group of parameters influencing the entire operation of the machining program;

at least one processor communicatively connected to the parameter database the at least one processor configured to store an operation content of each block of the machining program at the time of operating the machine tool, extract from the parameter database, based on the stored operation content of each block, parameter information for parameters relating to the operation content of each block and for parameters influencing the entire operation of the machining program, and determine, based on the extracted parameter information, at least one of (i) an unset parameter among the parameters relating to the operation content, and (ii) an unset parameter among the parameters influencing the entire operation of the machining program, wherein the at least one unset parameter is determined based on a comparison of a setting value for the at least one parameter currently set in the numerical controller with a recommended setting value for the at least one parameter included in the extracted parameter information; and a display unit configured to display information relating to one or both of (i) an overview of the at least one unset parameter and (ii) the recommended setting value for the at least one parameter, wherein, if the at least one unset parameter corresponds to a parameter affecting a path of the machine tool during operation, the information displayed on the display unit includes a warning statement indicating that (i) the at least one unset parameter affects the path of the machine tool and (ii) the path of the machine tool should be checked before setting the at least one unset parameter.

2. The numerical controller according to claim 1, wherein, in the information relating to the plurality of parameters, information of recommended setting values of the parameters is included, and wherein the at least one processor is configured to detect a parameter that has a setting value currently set in the numerical controller being different from the recommended setting value of each parameter stored in the parameter database, among the parameters relating to the operation contents and the parameters influencing the entire operation, as an unset parameter.

3. The numerical controller according to claim 1, further comprising:

a processing time measurement unit that measures a processing time of each block of the machining program at the time of operating the machine tool;

a changed parameter information storage unit that stores changed parameter information when a parameter is changed;

a before-parameter-change processing time storage unit that stores a processing time of each block of the machining program before the parameter change, measured by the processing time measurement unit; and an after-parameter-change processing time storage unit that stores a processing time of each block of the machining program after the parameter change, measured by the processing time measurement unit;

wherein the at least one processor is configured to:

specify, based on the processing time stored in the before-parameter-change processing time storage unit and the processing time stored in the after-parameter-change processing time storage unit, a block of the machining program having the processing time changed before and after the parameter change, specify, by referring to the parameter database, the changed parameter information stored in the changed parameter information storage unit relating to the operation content of the specified block, and specify parameter information stored in the changed parameter information storage unit belonging to the group of parameters influencing the entire operation.

4. The numerical controller according to claim 2, further comprising:

a processing time measurement unit that measures a processing time of each block of the machining program at the time of operating the machine tool;

a changed parameter information storage unit that stores changed parameter information when a parameter is changed;

a before-parameter-change processing time storage unit that stores a processing time of each block of the machining program before the parameter change, measured by the processing time measurement unit; and an after-parameter-change processing time storage unit that stores a processing time of each block of the machining program after the parameter change, measured by the processing time measurement unit;

wherein the at least one processor is configured to:

specify, based on the processing time stored in the before-parameter-change processing time storage unit and the processing time stored in the after-parameter-change processing time storage unit, a block of the machining program having the processing time changed before and after the parameter change, specify, by referring to the parameter database, the changed parameter information stored in the changed parameter information storage unit relating to the operation content of the specified block, and specify parameter information stored in the changed parameter information storage unit belonging to the group of parameters influencing the entire operation.

* * * * *